United States Patent [19]

Inoue et al.

[11] 4,015,074
[45] Mar. 29, 1977

[54] VOLUNTARY INFORMATION TRANSMITTING APPARATUS IN A WIRED TELEVISION SYSTEM

[75] Inventors: Yoshikatsu Inoue; Takeshi Takeuchi, both of Tokyo, Japan

[73] Assignee: Hochiki Corporation, Tokyo, Japan

[22] Filed: Feb. 9, 1976

[21] Appl. No.: 656,692

[30] Foreign Application Priority Data

Feb. 13, 1975 Japan .................. 50-20144[U]

[52] U.S. Cl. .................. 358/86; 178/DIG. 13; 325/308
[51] Int. Cl.² ........................... H04N 7/18
[58] Field of Search .......... 178/5.6, 5.8 R, DIG. 13; 325/54, 57, 303, 308, 466

[56] References Cited

UNITED STATES PATENTS

| | | | |
|---|---|---|---|
| 3,639,686 | 2/1972 | Walker | 325/466 |
| 3,860,746 | 1/1975 | Takeuchi | 178/5.6 |
| 3,921,074 | 11/1975 | Baird | 325/303 |

*Primary Examiner*—Howard W. Britton

[57] ABSTRACT

Voluntary information transmitting apparatus in a wired television system comprises an information signal generator which generates a guide information signal at an ordinary time and an alarm information signal in an emergency, and a control signal generator which generates in the emergency a control signal for causing each television receiver to pick out the alarm information signal. The information and control signals generated by the generators and a television broadcast signal are mixed and transmitted to the television receiver of each subscriber. The television receiver is equipped with a remote control unit, so that the alarm information signal can be automatically received in the emergency. The information signals are transmitted as signals having the same frequency band as that of the television broadcast signal, so that the transmitting circuit of the system requires no special electric equipment.

3 Claims, 4 Drawing Figures

VOLUNTARY INFORMATION TRANSMITTING APPARATUS IN A WIRED TELEVISION SYSTEM

This invention relates to voluntary information transmitting apparatus in a wired television system in which various information signals at an ordinary time and an alarm information signal in an emergency are transmitted as signals having the same frequency band as that of television broadcast signals.

At, for example, the outbreak of a fire, it is desirable that the subscribers of a CATV compulsorily receive information on an alarm by means of television receivers. In a wired television system such as CATV and MATV, therefore, emergency reporting apparatus has been developed by which, even when the subscribers are receiving a voluntary broadcast or retransmission broadcast, the reception is interrupted and an emergency reporting information is introduced in an emergency. Regarding the apparatus, U.S. Pat. No. 3,860,746 has been issued to the inventors of the present application.

However, the emergency reporting signal is transmitted only when the fire etc. have broken out, and the apparatus is scarcely used. In order to receive such alarm information signal for emergency, it is required to dispose facilities for transmitting the reporting signal and a splitter or a signal change-over device in each television receiver. This poses the problem that the expense of equipment is great in proportion to the frequency in use. Another problem is that since a splitter disposed in the signal transmitting circuit in this case need be capable of sending both a television broadcast signal and the reporting signal different in the frequency band from the television broadcast signal, one of an especially wide frequency band must be used.

In a wired television system in a hotel having a large number of rooms, it is desirable that the sketch drawing of the building, the course of refuge and other necessary information can normally be received at need by a television receiver arranged in each room. In the case of the hotel etc., even when lodgers have obtained information on an alarm in an emergency, they are often at a loss for a countermeasure. It is therefore more favorable that only the responsible person of each block or region knows the information on the emergency alarm and that he conducts the lodgers. In such case, accordingly, it is preferable also from the viewpoint of the expense of installation that the lodgers can receive only the ordinary information and that only the responsible person can receive the alarm signal in the emergency.

Further, it is recently desired in the wired television system that the broadcast of self-made program such as press news and cookery program can be freely received at any time. In such case, if the alarm signal for emergency and the self-made broadcast signal at an ordinary time are made to have the same frequency band as that of the television broadcast signals, both the self-made program signal and the emergent alarm signal will be received at low cost.

It is the first object of this invention to provide voluntary information transmitting apparatus according to which a television receiver can receive information signals of the course of refuge etc. at need at an ordinary time, while it can automatically pick out an alarm information signal in an emergeny.

The second object is to provide voluntary information transmitting apparatus according to which the subscribers of a CATV are divided into blocks, a custodian is appointed every block, only the television receiver of the custodian can receive emergent alarm information, and the other subscribers can receive ordinary information signals of a self-made program without installing any special unit.

The third object is to provide voluntary information transmitting apparatus according to which even when a television receiver is not under reception, it is connected with a power supply in an emergency so that the subscriber is forced to receive an emergency alarm information.

Figure 1A:
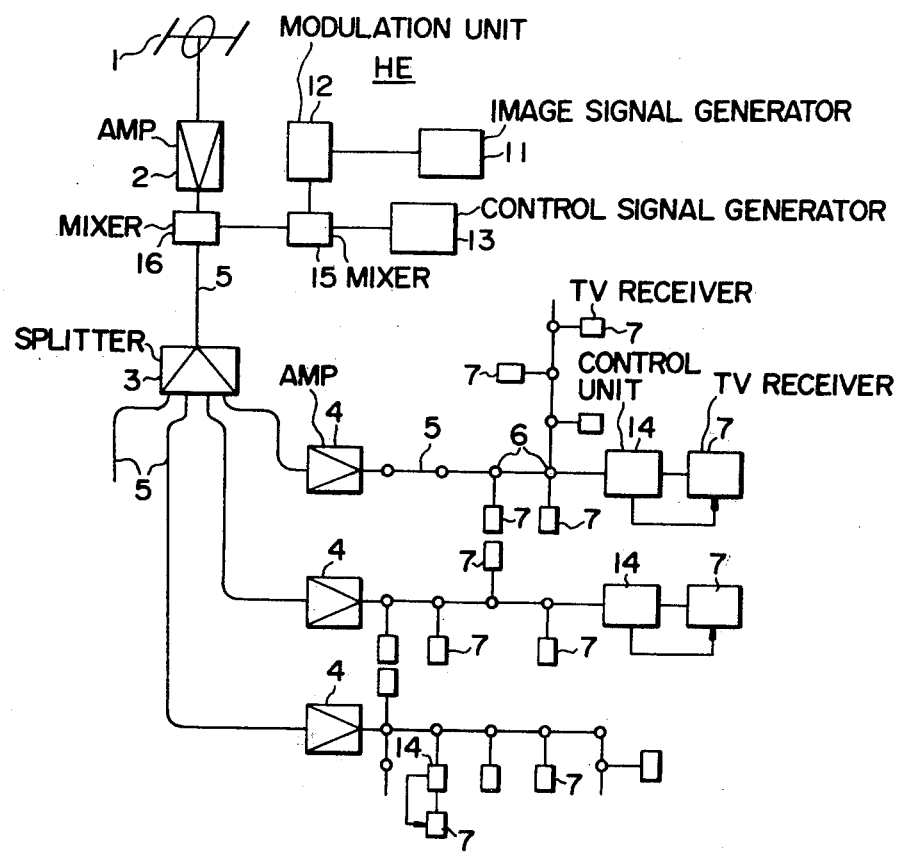
FIG. 1a and FIG. 1b show wired television systems using the present invention.
Figure 2:
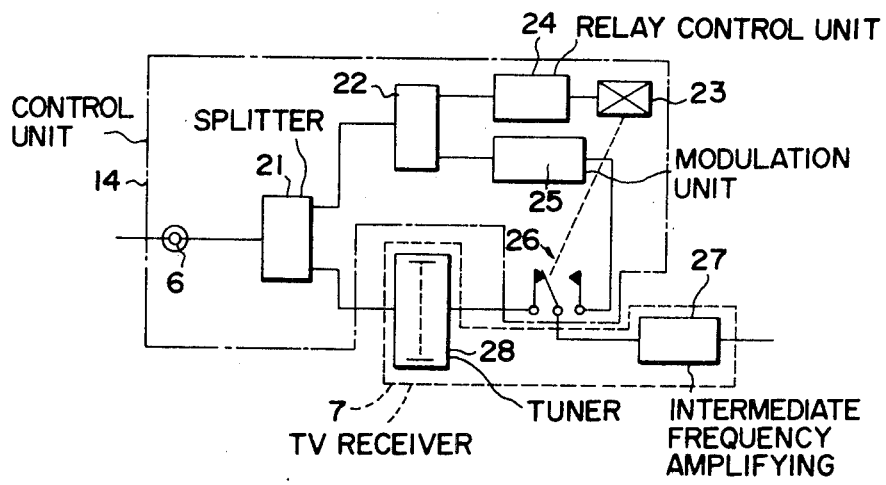
FIG. 2 and FIG. 3 show control units for the present invention.

This invention will now be described with reference to FIGS. 1a and 2. A community antenna 1 in a wired television system for receiving television broadcast signals is connected to an amplifier 2, which is connected through a mixer 16 to a splitter 3. The mixer 16 mixes the television broadcast signal from the amplifier 2 and an alarm information signal and an emergency control signal from another mixer 15. A control room in the wired television system is equipped with an information signal generator 11 which provides picture and voice signals for an alarm, and a control signal generator 13 which provides a signal for controlling television receivers on the subscriber side in an emergency. These information signals are based on the voluntary or self-active broadcast of the system in opposition to the television broadcast signals. The information signal generator 11 transmits guide information signals of a course of refuge etc. to be received ordinarily, and the alarm information signals to be received in the emergency. The transmission of the alarm information signals is performed automatically or manually in the emergency. In the case of the automatic transmission, the transmission from a video tape for the ordinary information may be changed-over to that from a video tape for the alarm information by relays etc. in the information signal generator 11. The manual change-over is applied where more appropriate alarm information signals are sent by the use of industrial television camera. In this case, it is only required to change objects to be photographed. The ordinary guide information may include information on press news, information on cooking, etc. in addition to those on the course of refuge, etc. The information signal generator 11 is connected with a modulation unit for transmission 12, which modulates the information signal into the signal band of the television broadcast signal. The control signal generator 13 generates d.c. signal. The modulator unit for transmission 12 and the control signal generator unit 13 are connected to the mixer 15. The mixer 15 mixes the signals from both the units and delivers the mixed signals to the mixer 16. The output terminal of the mixer 16 is connected to the splitter 3, which delivers the mixed signals to the respective subscribers' television receivers 7. Since all the information signals to flow through the splitter 3 are of the frequency band of the television broadcast signals, the transmission band of the splitter 3 need not be especially wide. Each of the plurality of output terminals of the splitter 3 is connected to an amplifier 4. A signal transmission line 5 is connected to the output terminal of the amplifier 5. The respective television receivers 7 are connected through television terminals 6 to the signal transmission line 5. The television receiver 7 of the custodian of each region in the system is equipped with a remote control unit 14 so that the emergency information can be automatically picked out. The television receivers of the subscribers other than the custodian are not provided with the remote control unit 14. The input terminal of the remote control unit 14 is connected to a splitter 21. Among input signals to the splitter 21, the television broadcast signal and the ordinary guide information signal are fed to a tuner 28, and the alarm information signal and the control signal for emergency are fed to a branching filter 22. The output terminal of the tuner 28 is connected to an intermediate frequency amplifier stage 27 of the television receiver 7 through a change-over switch 26 which is disposed in the remote control unit 14. When the signals for emergency are received as inputs, the branching filter 22 separately delivers the picture and voice information signals to a frequency converter 25 and the control signal to a relay control unit 24. The branching filter 22 is constructed of a capacitor for passing the information signal and a coil for passing the control signal. The output terminal of the relay control unit 24 is connected to a relay 23, which changes-over the change-over switch 26 in a manner to be stated later. The output terminal of the frequency converter 25 is connected through the change-over switch 26 to the intermediate frequency amplifier stage 27. Ordinarily, the change-over switch 26 connects the intemediate frequency amplifier stage 27 to the tuner 28. In an emergency, the relay 23 is energized by the control signal, and the frequency converter 25 and the intermediate frequency amplifier stage 27 are connected. The purpose of use of the frequency converter 25 is that the alarm information signal in the frequency band of the television broadcast signal as sent to the remote control unit 14 is delivered as an input to the intermediate frequency amplifier stage 27 without the intervention of the tuner 28. That is, in order that units of conventional operating ranges may be employable as the splitter 3 etc. of the wired television system, signals in the frequency band of the television broadcast signals are used as the alarm information signals.

With the wired television system thus constructed, ordinarily the guide information such as the course of refuge and the press news can be freely received by setting the television receiver to a channel of the desired self-made broadcast program. In an emergency, the alarm signal generator 11 and the control signal generator 13 in the control room of the system provide the respective signals, and the television receiver (in the custodian's room) 7 equipped with the remote control unit 14 has the change-over switch 26 changed-over by the action of the relay 23 and has the alarm information signal automatically sent to the intermediate frequency amplifier stage 27. Accordingly, the custodian can know the emergency and give a proper countermeasure to the subscribers in the region or group under his care.

Figure 1B:
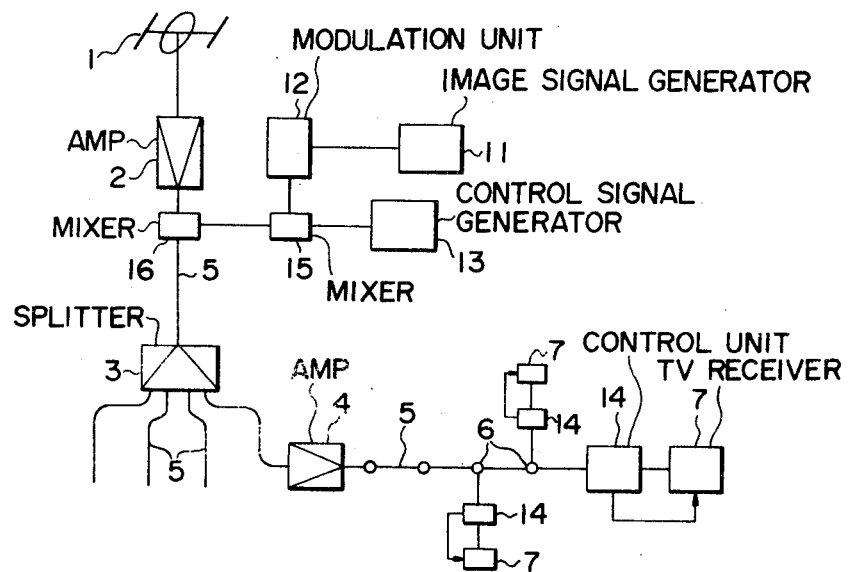

A wired television system shown in FIG. 1b is so constructed that the remote control units 14 are disposed for all the subscribers. It is applied to a case where the positions of reception of the respective subscribers are distant and where even when the custodian of the region is stationed, he cannot give the alarm information in an emergency.

Figure 3:
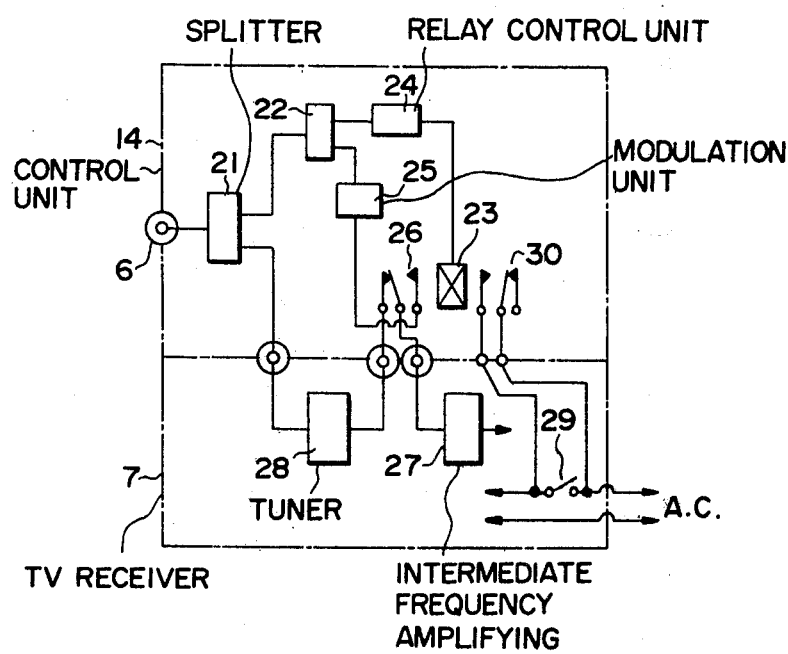

FIG. 3 shows an embodiment in which even when the television receiver 7 is not receiving any television broadcast, it can receive the alarm information signal in an emergency by forciby turning "on" a power supply switch 29 of the receiver. More specifically, in addition to the change-over switch 26 which connects the intermediate frequency amplifier stage 27 selectively to the tuner 28 or to the frequency converter 25, the second change-over switch 30 is provided. The second change-over switch 30 is connected in parallel with the power supply switch 29 of the television receiver 7. The two change-over switches 26 and 30 are simultaneously changed-over by the relay 23. The first change-over switch 26 is changed-over in the same way as in the previous embodiments. The second change-over switch 30 is changed-over by the relay 23 to turn'-'on" the power supply of the television receiver 7 when the control signal is fed to the remote control unit 14. Accordingly, even if the television receiver 7 is not under reception, it can be forced to receive the emergency alarm information signal. The remaining construction and function are the same as in the foregoing embodiments.

As described above, according to this invention, the frequency band of the television broadcast signals is employed for the ordinary guide information signal and the emergent alarm information signal. Therefore, the splitter etc. for use in the transmitting circuit of the wired television system may be conventional ones, and the expense of equipment may be small.

Since the transmitting apparatus of this invention can transmit the ordinary guide information signal and the emergent alarm informaton signal by the identical circuit, it has eliminated the waste that, as in the case of transmitting only the alarm information signal, the chances of utilization of the apparatus are few in proportion to the cost of equipment.

Furthermore, in an emergency, even when the television receiver of each subscriber is receiving any television broadcast program or when the power source of the television receiver is "off", the alarm information signal is automatically transmitted to the intermediate frequency amplifier stage, and the subscriber can know the alarm information. This is favorable as the alarm apparatus.

We claim:

1. In a wired television system wherein television broadcast signals received by a community antenna are transmitted through a splitter to television receivers of receiving subscribers, voluntary information transmitting apparatus in a wired television system comprising an information signal generator which transmits a guide information signal at an ordinary time and an alarm information signal in an emergency, a modulator which modulates the signal from said information signals generator into a frequency band of the television broadcast signal, a control signal generator which provides in the emergency a control signal for causing the television receiver on the subscriber side to pick out said alarm information signal, a mixer which mixes said information signal and said control signal with said television broadcast signal, a branching filter which separately transmits said information signal and said control signal among said television broadcast signal, information signal and conrol signal to be transmitted to said television receiver, a frequency converter which converts said alarm information a signal from said branching filter into an intermediate frequency of said television receiver, and a change-over switch disconnects a tuner of said television receiver and an intermediate frequency amplifier stage thereof and connects said frequency converter and said intermediate frequency amplifier stage by said control signal.

2. Voluntary information transmitting apparatus in a wired television system as defined in claim 1, wherein the receiving subscribers in the CATV system are sorted into blocks, and only the television receiver of a custodian of said each block is equipped with a control unit which comprises said branching filter, said frequency converter and said change-over switch and which picks out said alarm information signal.

3. Voluntary information transmitting apparatus in a wired television system as defined in claim 1, wherein a second change-over switch is disposed in parallel with a power supply switch of said television receiver, and said second change-over switch is changed-over to "on" by said control signal from said branching filter.

* * * * *